(12) United States Patent
Kim et al.

(10) Patent No.: US 9,158,696 B2
(45) Date of Patent: Oct. 13, 2015

(54) HIDING INSTRUCTION CACHE MISS LATENCY BY RUNNING TAG LOOKUPS AHEAD OF THE INSTRUCTION ACCESSES

(75) Inventors: Ilhyun Kim, Beaverton, OR (US); Alexandre J. Farcy, Hillsboro, OR (US); Choon Wei Khor, Gelugor (MY); Robert L. Hinton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 13/992,228

(22) PCT Filed: Dec. 29, 2011

(86) PCT No.: PCT/US2011/067772
§ 371 (c)(1),
(2), (4) Date: Jun. 6, 2013

(87) PCT Pub. No.: WO2013/101031
PCT Pub. Date: Jul. 4, 2013

(65) Prior Publication Data
US 2014/0229677 A1      Aug. 14, 2014

(51) Int. Cl.
G06F 12/08      (2006.01)
G06F 9/38       (2006.01)

(52) U.S. Cl.
CPC .......... *G06F 12/0875* (2013.01); *G06F 9/3802* (2013.01); *G06F 12/0862* (2013.01)

(58) Field of Classification Search
None
See application file for complete search history.

(56) References Cited

U.S. PATENT DOCUMENTS

| | | | |
|---|---|---|---|
| 5,692,152 A * | 11/1997 | Cohen et al. | 711/140 |
| 6,076,159 A * | 6/2000 | Fleck et al. | 712/241 |
| 6,591,343 B1 | 7/2003 | Col et al. | |
| 7,406,581 B2 | 7/2008 | Southwell | |
| 2009/0019257 A1 | 1/2009 | Shen et al. | |
| 2009/0287907 A1 * | 11/2009 | Isherwood et al. | 712/205 |
| 2011/0296136 A1 | 12/2011 | O'Connor et al. | |
| 2012/0204005 A1 * | 8/2012 | Dockser et al. | 712/205 |

OTHER PUBLICATIONS

PCT International Search Report for PCT Counterpart Application No. PCT/US2011/067772, 3 pgs., (Sep. 27, 2012).
PCT Written Opinion of the International Searching Authority for PCT Counterpart Application No. PCT/US2011/067772, 4 pgs., (Sep. 27, 2012).
PCT Notification concerning Transmittal of International Preliminary Report on Patentability (Chapter I of the Patent Cooperation Treaty) for PCT Counterpart Application No. PCT/US2011/067772, 6 pgs., (Sep. 1, 2011).

* cited by examiner

*Primary Examiner* — Gary Portka
(74) *Attorney, Agent, or Firm* — Nicholson De Vos Webster & Elliott LLP

(57) ABSTRACT

This disclosure provides techniques and apparatuses to enable early, run-ahead handling of IC and ITLB misses by decoupling the ITLB and IC tag lookups from the IC data (instruction bytes) accesses, and making ITLB and IC tag lookups run ahead of the IC data accesses. This allows overlapping the ITLB and IC miss stall cycles with older instruction byte reads or older IC misses, resulting in fewer stalls than previous implementations and improved performance

21 Claims, 7 Drawing Sheets

HIDING INSTRUCTION CACHE MISS LATENCY BY RUNNING TAG LOOKUPS AHEAD OF THE INSTRUCTION ACCESSES

CROSS-REFERENCE TO RELATED APPLICATION

This patent application is a U.S. National Phase Application under 35 U.S.C. §371 of International Application No. PCT/US2011/067772, filed Dec. 29, 2011, entitled HIDING INSTRUCTION CACHE MISS LATENCY BY RUNNING TAG LOOKUPS AHEAD OF THE INSTRUCTION ACCESSES.

TECHNICAL FIELD

This disclosure relates generally to the field of microprocessors. In particular, this disclosure relates to handling cache misses using tag lookups that are decoupled from instruction byte accesses.

BACKGROUND ART

A processor core typically includes an instruction fetch unit for generating fetch requests to retrieve instructions from an instruction cache (IC). When an instruction is available (i.e., a cache hit), the fetched instruction is typically stored in a fetch queue. When the instruction is not available (i.e., a cache miss), a memory request is usually generated and sent to a lower level of memory to retrieve the instruction. The pipeline may then stall until the instruction becomes available by servicing the cache miss.

In recent processors, the instruction fetch includes a branch prediction unit (BPU). A current IP is provided, which the processor core uses to access the BPU that generates predictions for branches that belong to the current instruction fetch block associated with the current IP. The BPU's prediction granularity is N-byte (e.g., 32B, etc.). Based on the prediction outcomes, the BPU will generate the next fetch IP, which could be the current IP+N byte (if none is predicted taken), or the target address of a predicted taken branch. This next IP becomes the current IP in the next cycle, and is fed back to the BPU to generate the next IP.

The instruction fetch unit (IFU) is composed of the 3 units. 1) An instruction translation look-aside buffer (ITLB) that translated the current IP into a physical address, 2) the IC accessed by the physical address that returns the corresponding instruction bytes, and 3) an instruction stream buffer (ISB) that temporarily stores the cache lines sent by the lower level memory (e.g., L2) before being written into the IC (which may handle IC misses). The IFU's fetch access may occur at M-byte granularity (e.g., 16B), which may be equal to or lower than BPU's prediction bandwidth (N=M or N>M).

The IFU is a slave to the BPU and operates in a separate pipeline. The IFU's fetch follows the IPs that are generated by the BPU. If the BPU's prediction bandwidth is higher than the IFU's fetch bandwidth (e.g., N=32B vs. M=16B), there is a FIFO queue called a branch prediction queue (BPQ) that bridges the bandwidth gap between the two pipelines. The BPU makes 32B predictions every cycle and allocates up to two entries that contain the fetch IPs. The number of BPQ entry writes is determined by N/M. The IFU reads one BPQ entry at a time, obtains the fetch IP, accesses the ITLB and IC sequentially, then sends the corresponding instruction bytes (e.g., 16B) down the pipeline for instruction decode.

Because of the bandwidth mismatch (e.g., N>M) and possible stall conditions in the IFU (e.g., IC miss), the BPU tends to run ahead of the IFU and the BPQ tends to hold multiple valid entries that tell where for IFU needs to fetch instructions from in the future. The BPQ may become full, which may result in a stall of the BPU's prediction pipeline until it finds a free BPQ entry. Meanwhile, IFU will continue to consume the BPQ entries and send instruction bytes down the pipeline.

There could be cache misses in the ITLB or IC when the IFU is unable to send the instruction bytes. An ITLB miss occurs when ITLB cannot find the matching entry with a physical address corresponding to the current fetch IP. In this case, the IFU stalls and sends a request to the page miss handler (PMH). The IFU resumes fetching after the PMH returns the physical addresses. In a similar fashion, an IC miss can occur when the IC cannot find the matching entry with the instruction bytes corresponding to the current physical fetch address. In this case, the IFU stalls, allocates an ISB entry (for the miss), and sends a fetch request to the lower level memory. The fetch resumes after the lower level memory returns the cache line back to the ISB. The cache lines in the ISB will be eventually be written into the IC, which is determined based on a couple of restrictions related to the inclusion handling and the IC write port availability. The IFU is allowed to send the instruction bytes either directly from the ISB or from the IC after the ISB bytes are written back to the IC.

This stall may result in a delay in the execution of instructions, and thus reduce performance of the processor core. In order to improve performance of the processor, the IFU may generate speculative fetch requests to the lower level memory before IFU encounters an actual miss in attempt to hide delays. The speculative fetch requests could be wasteful if the matching cache line already exists in the IFU. Because the existence of the cache line is not known unless an IFU is looked up, a processor may use a mechanism to filter out unnecessary speculative fetch requests, or may access the unused read port while the IFU is stalled waiting for a prior miss to be serviced.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview disclosure provides techniques and apparatuses to enable early, run-ahead handling of IC and ITLB misses by decoupling the ITLB and IC tag lookups from the IC data (instruction bytes) accesses, and making ITLB and IC tag lookups run ahead of the IC data accesses. This allows overlapping the ITLB and IC miss stall cycles with older instruction byte reads or older IC misses, resulting in improved performance.

The techniques and apparatuses described herein may be implemented in a number of ways. Example implementations are provided below with reference to the following figures.

Figure 1:
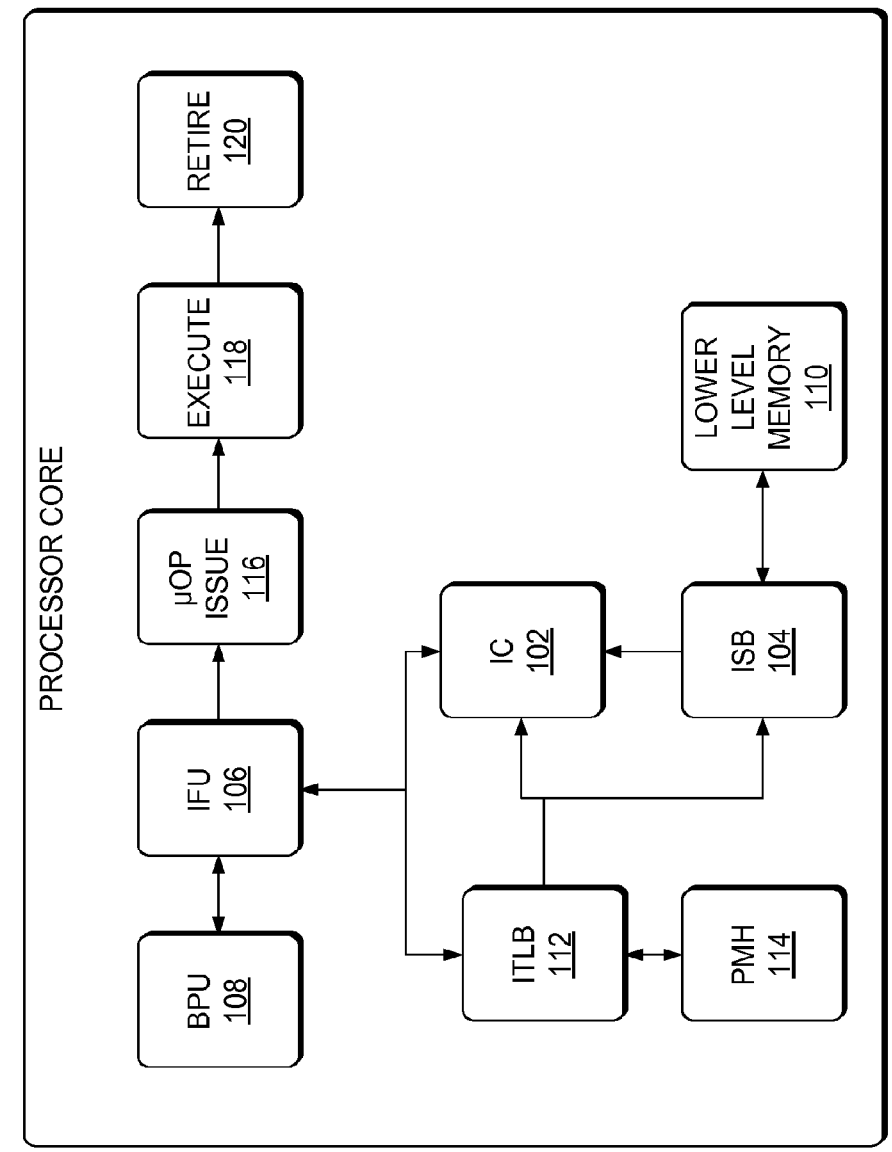
FIG. 1 is a block diagram of an illustrative processor core.

FIG. 1 is a block diagram of an illustrative processor core 100. The processor core 100 may be one of a plurality of processor cores included in a processor unit.

The processor core 100 may include an instruction cache (IC) 102, an instruction stream buffer (ISB) 104 an instruction fetch unit (IFU) 106, and a branch prediction unit (BPU) 108. The IFU 106 may be in communication with the IC 102 and the ISB 104. The IFU 106 may also be in communication with the BPU 108. The processor core 100 may also include an instruction translation look-aside buffer (ITLB) 112 in communication with a page miss handler (PMH) 114. The ITLB 112 may be in communication with the IFU 106, the IC 102, and the ISB 104.

The IC 102 may store instructions, which can be retrieved, decoded and issued for execution by the processor core 100. The IFU 106 may perform fetch (and prefetch) operations to the ISB 104, the IC 102, and lower level memory 110 using predictions obtained from the BPU 108.

In some embodiments, the processor core 100 may include a µOP issue 116 to issue, for execution by an execution stage 118, micro-operations corresponding to instructions of sets of instruction data and/or instruction streaming buffer 104. The processor may also include a retirement stage 120 to retire the micro-operations upon completion of their execution by the execution stage 118.

Figure 2:
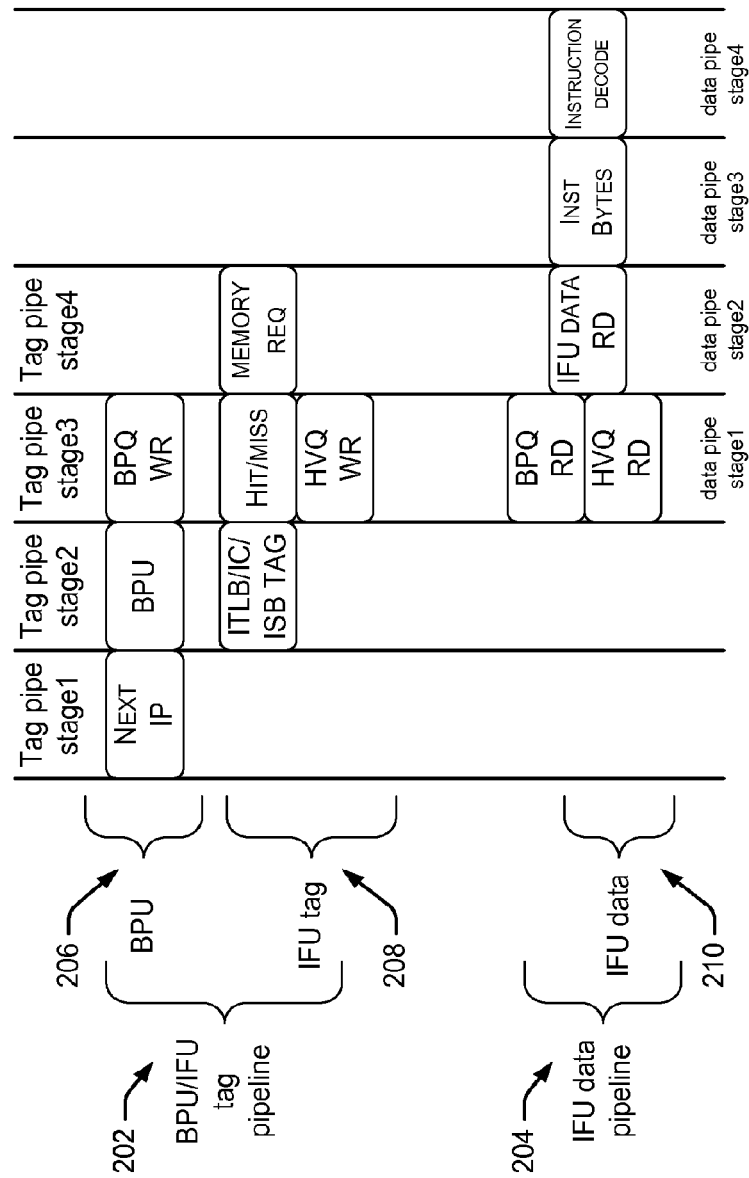
FIG. 2 shows illustrative pipelines including a branch prediction pipeline that is decoupled from an instruction fetch data pipeline.

FIG. 2 shows illustrative pipelines 200 including a branch prediction unit (BPU)/IFU tag pipeline 202 that is decoupled from an instruction fetch data pipeline 204. In various embodiments, the BPU/IFU tag pipeline includes a BPU 206 and an IFU tag 208. The IFU is decomposed into the IFU tag 208 and IFU data 210. The IFU tag 208 includes an instruction translation look-aside buffer (ITLB), an IC tag (i.e., a cache line tag match using a physical fetch address to identify which cache line to access), and an ISB tag. The IFU data 210 includes an IC data (that contains the instruction bytes in the IC) and ISB data (that contains the instruction bytes in the ISB).

In accordance with various embodiments, the units that belong to IFU tag 208 are made accessible in the BPU/IFU tag pipeline 202 so that the ITLB and IC hit/miss results can be discovered in parallel with the BPU lookups. This allows the IFU tag accesses to occur in a higher-bandwidth pipeline (N>M), and to encounter ITLB or IC misses before the IFU data 210 actually fetches the instruction bytes in the IFU data pipeline 204. If IFU tag accesses (in parallel with BPU) are sufficiently running ahead of IFU data accesses, The ITLB or IC miss latency is partially or completely hidden, which is discussed in further detail below.

In the decoupled IFU, the IFU data 210 no longer performs the address translation or tag lookups, but it still needs to know where to fetch the instruction bytes from. This may be accomplished using a hit vector queue (HVQ). The HVQ may have the same number of entries as the BPQ, and read/write may be managed in the same way. Instead of the branch prediction information and IPs, the HVQ stores hit vectors that tell either IC set and ways, or ISB entry indices.

Basic Algorithms:

In parallel with BPU lookup, the IFU tag 208 is looked up with the fetch address IP. This lookup may result in the following cases: (1) An ITLB miss may occur, which may cause the BPU/IFU tag pipeline to stall. An ITLB miss request may then be sent to the PMH. Sometime later, the PMH returns the address translation, then the BPU/IFU tag lookup resumes.

(2) An ITLB hit and IC tag hit may occur, which may result in the IC set and way address to be written into the HVQ. Later, the IFU data reads the HVQ entry, and accesses the IC line using the given set and way address.

(3) An ITLB hit, IC tag miss, and ISB tag miss may occur (i.e., a "true miss" case in which the IFU does not contain the necessary instruction cache line). In this case, an ISB entry may be allocated and an external fetch request is sent to the lower level memory (e.g., L2). The IFU tag 208 writes an index of the newly allocated ISB entry into the HVQ. However, the BPU/IFU tag pipeline 202 continues to run without stall until other stall conditions (e.g., ISB or BPQ full) occur. Later, the IFU data 210 reads an HVQ entry, and checks if the corresponding ISB entry has received the cache line from the lower level memory. If the instruction bytes are not yet available, the IFU data will be stalled until the lower level memory returns the corresponding cache line. If the instruction bytes are available in the ISB, the IFU data sends them down the pipeline.

(4) ITLB hit, IC tag miss and ISB tag hit may occur, where a matching ISB entry was already allocated by a previous true miss. The IFU tag 208 writes the index of the ISB entry that it just hit into the HVQ. Here, the BPU/IFU tag pipeline 202 continues to run without stall until other stall conditions (e.g., ISB or BPQ/HVQ full) occur. Later the IFU data reads a HVQ entry and check if the corresponding ISB entry has received the cache line from the lower level memory. If the cache line is not yet available, the IFU data will be stalled until the lower level memory returns the corresponding cache line. If the instruction bytes are available in the ISB, the IFU data 210 sends the instruction bytes down the pipeline.

There are cases in which the IFU tag initially has either a true miss or an ISB tag hit (so an ISB index was written into the HVQ), but the cache line from ISB is written into the IC so the IFU data needs to get the instruction bytes from the IC instead of the ISB. This may be handled by updating the HVQ entries as discussed in detail with reference to FIG. 6. An ISB entry may receive the cache line from the lower level memory. When this cache line is written into the IC, all the valid entries in the HVQ may be checked to see if any of the valid entries have the matching ISB index. Then, the HVQ entries may be updated so that they have the set and way address of the IC entry that the ISB entry is being written into. Then, the ISB entry (both tag and data) is invalidated and becomes ready for new allocations.

Once the ISB IC fill and HVQ update is complete, all the subsequent lookups in the IFU data 210 that previously wanted to access the ISB entry will get the instruction bytes from the IC entry instead. All the subsequent lookups in the IFU tag 208 may now hit in the IC entry. In some instances, there could be cases in which the IFU tag initially hit in either IC or ISB tag, but the cache line was replaced or removed before the IFU data uses the line. In a processor core that provides "pipeline inclusion", the processor core guarantees an availability of the original cache line during the entire lifetime of an instruction from the fetch to retire. Therefore, this scenario (a line is replaced before use) is invalid and does not need to be addressed here. This inclusion property may be implemented by a separate mechanism. If the machine does not natively provide the necessary inclusion property, a similar IC in-use mechanism may be implemented to support pipeline inclusion.

Other Embodiments:

The "BPU based run-ahead handling of ITLB/IC miss" portion of the current disclosure does not necessary need the HVQ. In some embodiments, implementations may benefit from the same run-ahead property without relying on the HVQ although the HVQ may enable an inexpensive implementation. Other possible configurations include: (1) Replicate the IFU tag, and make it accessible in the BPU pipeline. All the access to the IFU data may be performed in the conventional way without the HVQ. (2) Move the entire IFU into the BPU pipeline to get the run-ahead property. The BPQ may be converted to the instruction byte buffers. When the ISB receives the cache line from the lower level memory, the corresponding byte buffer entries receive the cache line directly from the ISB. All instruction fetch (previously from IFU data) may be made directly from the byte buffer.

Illustrative Operation

Figure 3:
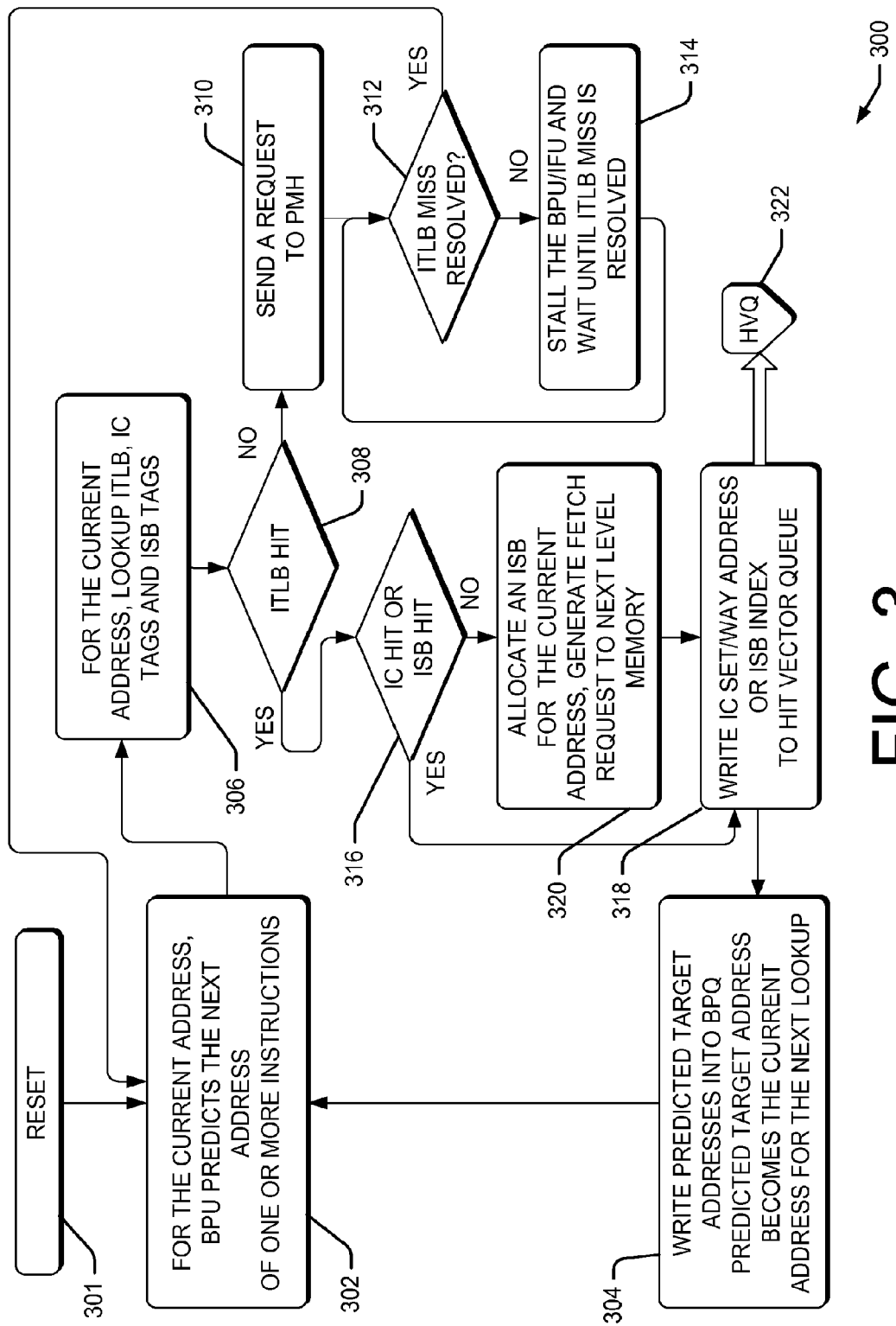
FIG. 3 is a flow diagram of illustrative process to handle instruction cache misses using instruction cache tag lookups.
Figure 4:
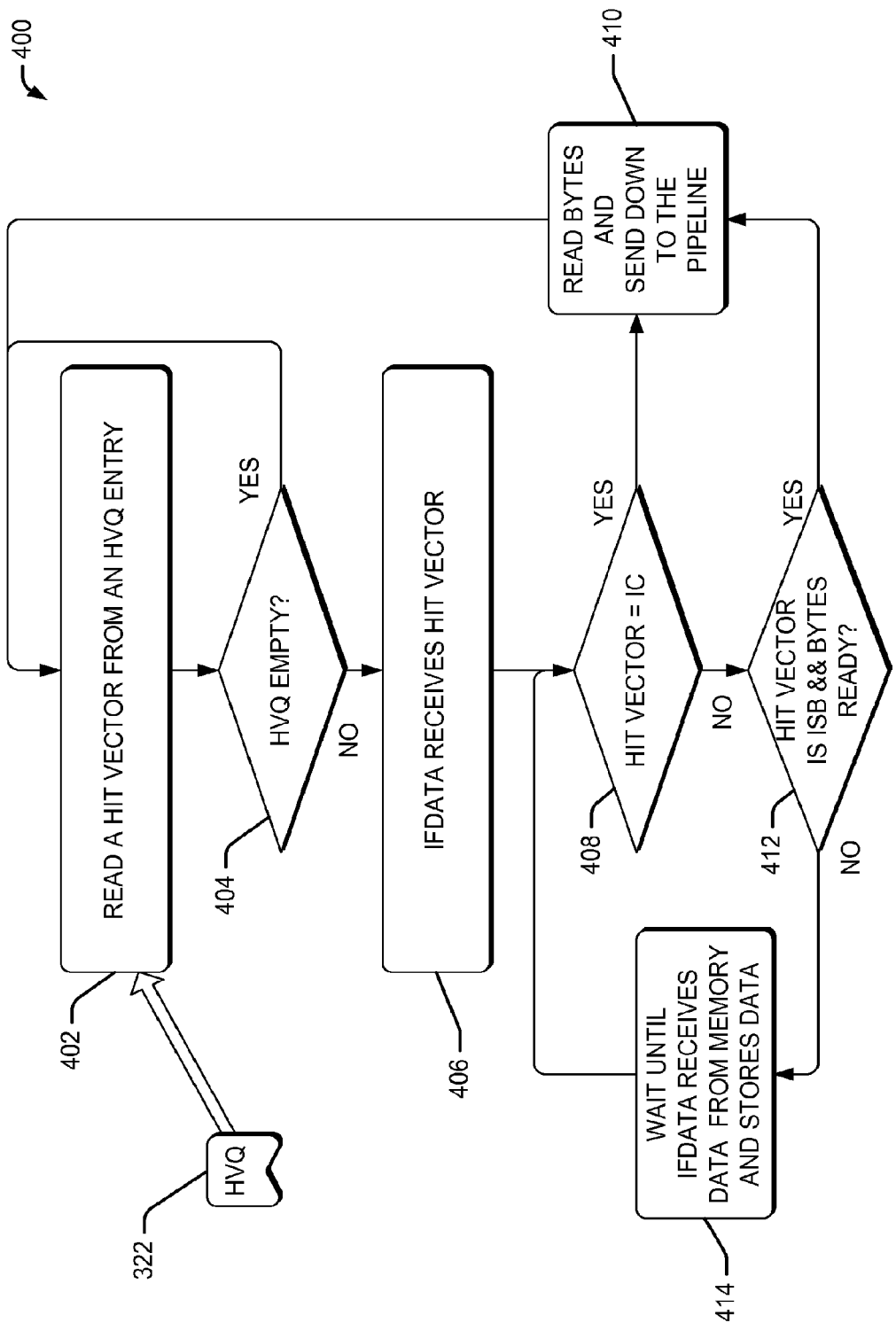
FIG. 4 is a flow diagram of illustrative process to perform the instruction cache data accesses.
Figure 6:
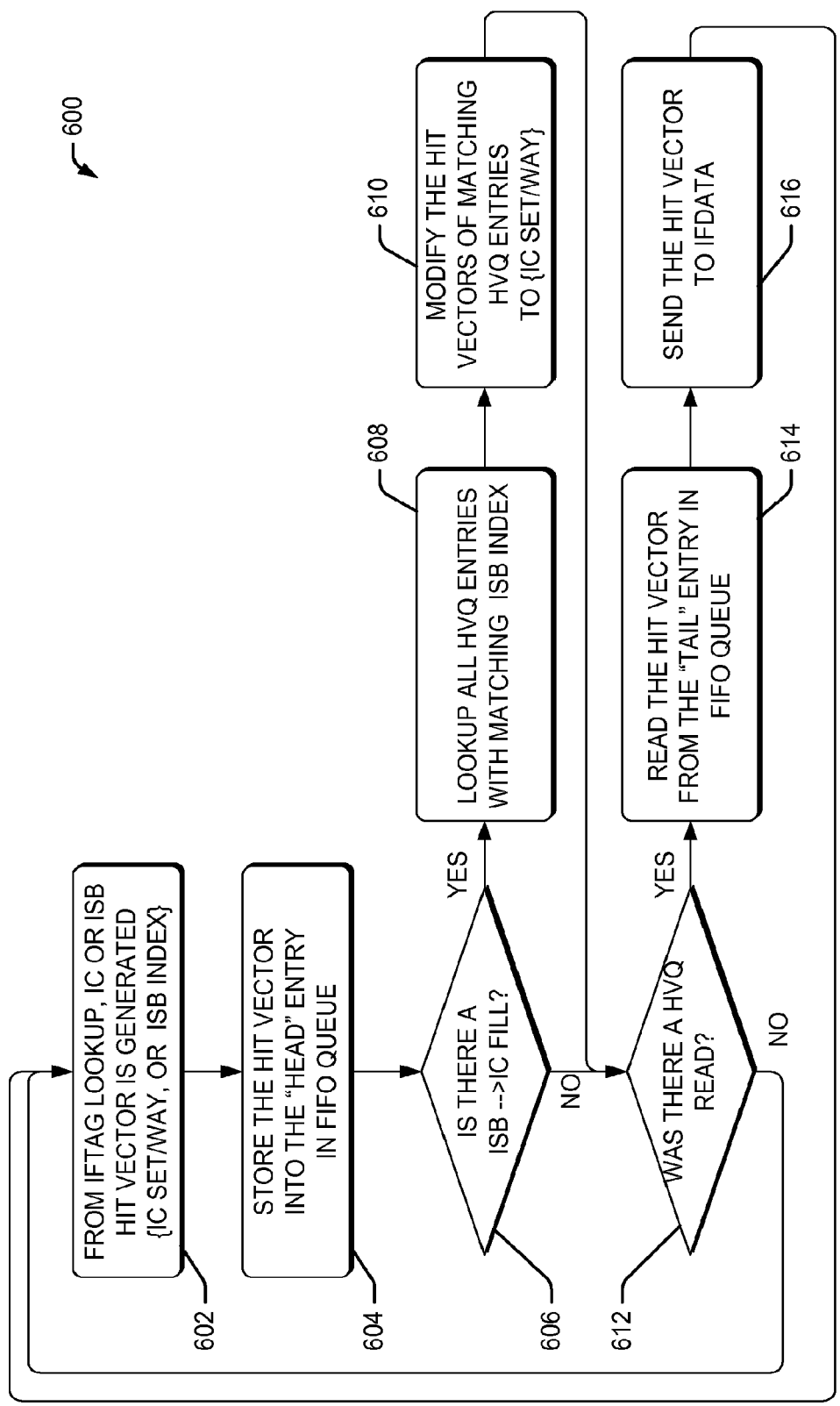
FIG. 6 is a flow diagram of an illustrative process to manage a hit vector queue.

FIGS. 3, 4, and 6 show processes that are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the process. The processes are described with reference to the environment 100 and the pipelines 200. Of course, the processes may be performed in other similar and/or different environments.

FIG. 3 is a flow diagram of illustrative process 300 to handle instruction cache misses using instruction cache tag lookups. The process 300 includes a BPU pipeline flow (using the BPU 206) and an IFU tag pipeline flow (using the IFU tag 208), which are performed in parallel. The process 300 may begin at 301 following a reset.

At 302, the BPU pipeline flow begins. For the current address, the BPU predicts the next address of the one or more instructions. In some embodiments, the operation 302 may be a 32 byte prediction per cycle. Thus, the BPU predicts branches in the current address to predict the next addresses.

At 304, the predicted addresses are written into the BPQ. In some instances, up to two entries may be written in the BPQ (e.g., 16 bytes per entry). The operations 302 and 304 may be repeated until the BPQ is full. In some embodiments, the IFU tag 208 performs operations 306-320 in parallel with the operations 302-304 performed by the BPU.

At 306, for the current address (determined at the operation 302), the IFU tag 208 performs a lookup of the ITLB, IC and ISB tags.

At 308, the IFU tag 208 detects whether an ITLB hit occurs. When an ITLB miss occurs (following the "no" route from the decision operation 308), the process sends a request to the PMH for an address translation at 310.

At 312, the process detects whether an ITLB miss is resolved. When the miss is unresolved (following the "no" route from the decision operation 312), the BPU and IFU pipelines stall at 314 until the PMH returns an address translation back. Then the current address is looked up again starting from the operation 302 when the miss is resolved (following the "yes" route from the decision operation 312). Returning to the decision operation 308, in an ITLB hit, ITLB provides the translated address and moves onto an operation 316 (following the "yes" route from the decision operation 308).

At 316, the IFU tag 208 detects whether an IC hit or an ISB hit occurs. In an IC hit, the instruction is already in the IC. When an ISB hit occurs, the instruction byte may or may not be available. However, the IFU tag only checks to see if the ISB hit occurs while the status of the instruction bit is detected in a separate process, which is decoupled from the process 300.

At 318, when a hit occurs at 316 (following the "yes" route from the decision operation 316), then the IFU tag has the set and ways address and the IFU tag writes an IC set/way address or ISB index to a hit vector queue (HVQ) 322. In some instances, the HVQ may receive up to two entries at 16 bytes per entry. At 318, the IFU tag records the address into the HVQ. Later, the IFU data pipeline reads from the HVQ 322 (described with reference to FIG. 4), and the IFU data then knows where to read the bytes from based on the hit vector written at the operation 318.

When no IC hit or ISB hit occurs at the decision operation 316, then processing continues at an operation 320 (following the "no" route from the decision operation 316). At 320, the IFU tag allocates an ISB entry for the current address and generates a fetch request to the lower level memory. The IFU tag may send an index of the newly allocated ISB entry, which is used in the decoupled process 400 that is described next. Following the operation 320, the IFU tag 208 proceeds to the operation 318 to write the ISB index (that just was allocated at 320) to the HVQ 322.

Returning to the operation 318, three different outcomes may occur: (1) an IC hit may occur at the operation 306, (2) an ISB hit may occur at the operation 306, or (3) a newly allocated ISB index may have a fetch request from the operation 320.

FIG. 4 is a flow diagram of illustrative process 400 to perform the instruction cache data accesses. The process 400 operates in conjunction with the process 300. As described above, and in greater detail below, the process 400 may benefit from the fetch requests performed at the operation 320 in the process 300, which may reduce or prevent stalls in the process 400. The process 400 may be performed at least in part by the IFU data 210.

At 402, the process 400 reads a hit vector from an HVQ entry in the HVQ 322. The HVQ 322 may store an IC set/way address or ISB index, instead of the full fetch address that is typically stored by the BPQ in prior implementations.

At 404, the process 400 determines whether the HVQ 322 is empty. When the HVQ is empty (following the "yes" route), then the process may stall until an entry in the HVQ becomes available. Otherwise, the process 400 may advance to an operation 406 (following the "no" route from the decision operation 404). Thus, the operations 402 and 404 retrieve data from the HVQ 322, which is then processed by the IFU data 210 as discussed next.

At 406, the IFU data 210 may receive the hit vector. The IFU data 210 may determine where to access the IC or the ISB to retrieve the instruction.

At 408, the IFU data 210 may detect whether the hit vector is in the IC. When the hit vector is in the IC, then the IFU data 210 has the bytes. Thus, when the hit vector points to the IC (following the "yes" route), then the IFU may read the bytes and send down the instruction to the pipeline at 410.

When the hit vector does not point to the IC (following the "no" route from the decision operation 408), then the hit vector points to the ISB. At 412, the IFU data 210 detects whether the hit vector points to the ISB and the bytes are ready (which were requested in a fetch request at the operation 320 in advance). If the bytes are ready (following the "yes" route), then the IFU data 210 reads the bytes and sends the bytes down to the pipeline in the operation 410. In this situation, the IFU data 210 does not stall because the bytes were requested in advance and received when needed by the IFU data 210.

When the bytes are not ready at the decision operation 412 (following the "no" route), then the IFU data 210 may wait until the data is received from the memory and, after receipt, may store the data. Here, the IFU data 210 stalls when the bytes are not ready. The process 400 continues at the decision operation 408 and exits at the operation 410 when the bytes are ready from the ISB.

As described with reference to FIGS. 3 and 4, the ISB is the bridge between the IC and the lower level memory. When a fetch request is outstanding, the IFU tag may have a corresponding entry for the address of the ISB (written at the operation 318), but the bytes may not be ready for the IFU data 210. Thus, the IFU data 210 may have to wait for the ISB to retrieve the bytes from the lower level memory (e.g., L2) at the operation 414.

When the process 300 is running sufficiently ahead of the process 400, the IFU tag 208 may send the fetch request at 318 at a first time. At a second time, the IFU data 210 may determine if the bytes are ready at the decision operation 412. If the ISB can retrieve the bytes from the lower level memory between the first time and the second time, then the IFU data 210 will not stall at 414, but will have the bytes ready and send them to the pipeline via the operation 410. Thus, the decoupling of the pipelines for the IFU tag 208 and the IFU data 210 may reduce stalls when the IFU tag performs the fetch requests at the operation 318 sufficiently ahead of the time the IFU data 210 looks for the bytes at the decision operation 412.

Figure 5:
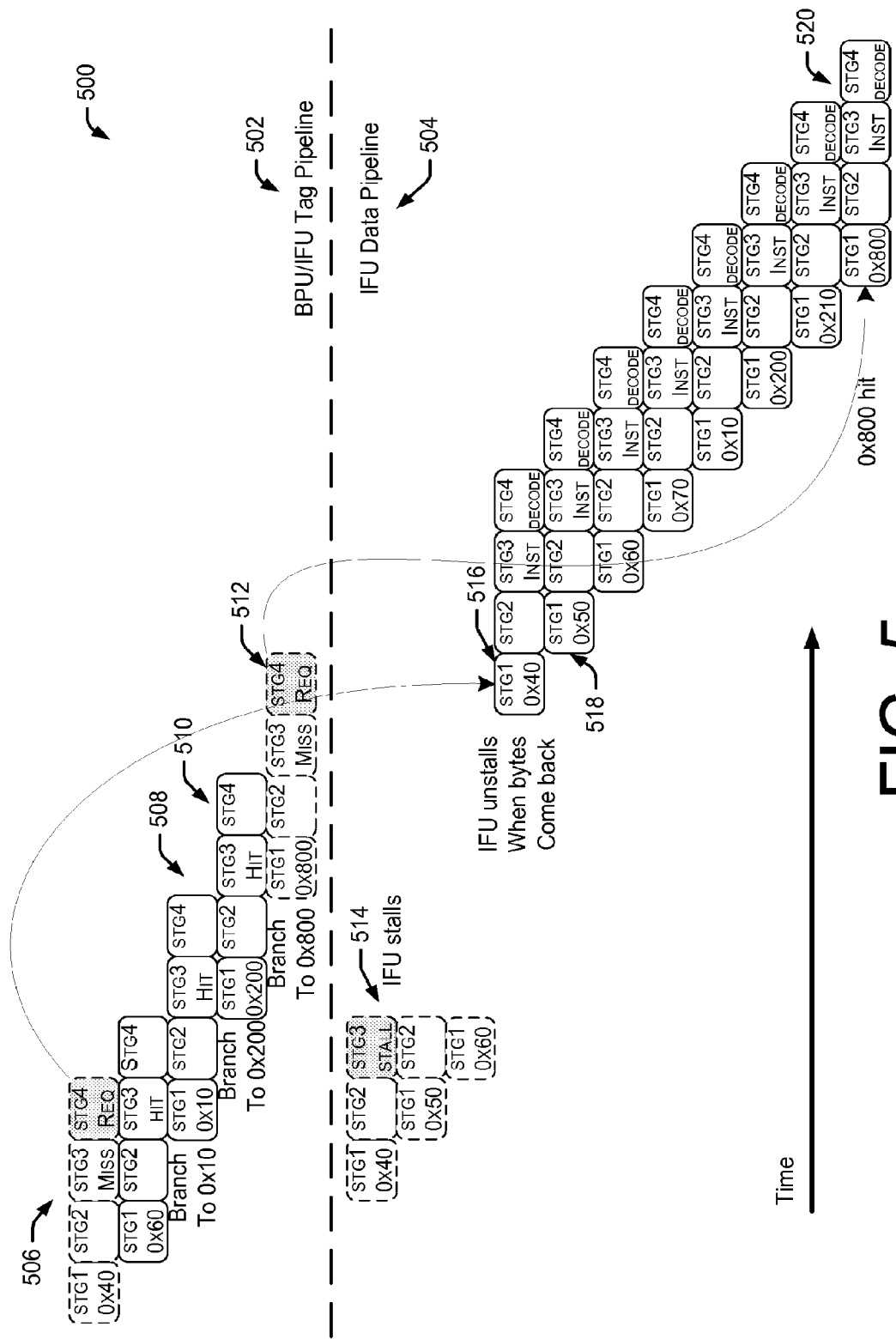
FIG. 5 shows illustrative pipeline that includes an example instruction cache miss and prefetched data following the miss.

FIG. 5 shows illustrative pipelines 500 that includes an example instruction cache miss and prefetched data following the miss. The pipelines 500 include a BPU/IFU tag pipeline 502 and an IFU data pipeline 504.

In this example, in the BPU/IFU tag pipeline 502, a first lookup 506 for an address 0x40 (which may cover both addresses 0x40 and 0x50 because BPU's 32B fetch granularity) may occur and may be a true miss (indicated by the dashed border around the operations). In the pipeline at location STG4, the IFU tag may allocate an ISB entry and send a request for the address 0x40 via the operation 320. Since the IFU tag pipeline does not need the instruction bytes, the IFU tag pipeline 502 continues to process the next line (which may be 0x60) without being stalled. The second lookup for an address 0x60 may hit in the ISB entry allocated by a previous lookup 506 because the addresses 0x40 and 0x60 may belong to a same cache line (64B granularity in this example).

Continuing with the example, the BPU/IFU tag pipeline 502 may have hits at 0x10, 0x200 at 508, 510, which may be processed by the IFU tag via the operation 318. The BPU/IFU tag pipeline 502 may then miss again at 0x800 512 and send out another fetch request via the operation 320. The BPQ/IFU tag pipeline 502 keeps moving after sending the request.

Meanwhile, the IFU data pipeline 504 may read out the hit vector from the HVQ 322. At 0x40 514, the IFU data 210 may have to stall and wait for the instruction to be retrieved by the ISB at the operation 414 in FIG. 4. Thus, the IFU data 210 may stall until the bytes become available. After the bytes come back and are successfully sent to the pipeline at 410 for 0x40 516, then the IFU data pipeline 504 may read the next hit vector at 402, thus 0x50 518. The IFU pipeline continues to process and has hits, which can be sent down to the pipeline via the operation 410. For example, the IFU tag pipeline may have an IC hit at 316, which results in the process 400 moving from the decision operation 408 to the operation 410 (read from IC data).

Continuing with the example, the IFU tag pipeline 502 has, by running ahead of the IFU data pipeline 504, already send a fetch request for the bytes for 0x800. When the IFU data pipeline 504 reads the hit vector for 0x800 520, then the bytes may be ready because of the prior request 512 by the IFU tag pipeline 502. Thus, the IFU data pipeline 504, may detect that the bytes are ready at the decision operation 412 for the address 0x800 and proceed (via the "yes" operation) to the operation 410 and send the bytes down to the pipeline without have to stall via the operation 414. The stall is avoided because the IFU tag pipeline sends the request for the bytes in advance of the processing of this address before the IFU data pipeline 504 processes the corresponding hit vector for this address. Thus, some stalls may be avoided in the IFU data pipeline 504, which may increase throughput and efficiency of the processing core.

FIG. 6 is a flow diagram of an illustrative process 600 to manage a hit vector queue. As discussed in FIG. 3, the IFU tag 208 may initiate a fetch request for bytes using the ISB at the operation 320. At the operation 318, the IFU tag 208 may write an ISB index into the HVQ. However, before the IFU data 210 reads the hit vector for the ISB, the stream buffer may have written the bytes to the IC and deallocated the stream buffer. In this situation, the hit vector for the bytes needs to be updated to reflect the location in the IC. The process 600 accomplishes this update. In some embodiments, the process 600 may be implemented with the process 300 and/or the process 400.

At 602, the IFU tag 208 may determine from an IFU tag lookup, a location of the bytes in the IC or the ISB and then generate a write (via the operation 318 in FIG. 3) that includes a set/way address for the IC or an ISB entry index.

At 604, the IFU tag 208 may store the hit vector into the "head" entry in a FIFO queue. The operations 602 and 604 may be similar to the operation 318.

At 606, the process 600 may detect whether an ISB to IC fill has occurred (e.g., ISB index x is filled into IC set/way address y), which may cause an update of the hit vector when the fill has occurred (following the "yes" route).

At 608, following the "yes" route from the decision operation 606, the process 600 may look up HVQ to locate the entries with matching ISB index.

At 610, the process may modify HVQ to update the hit vector. For example, the process may update {ISB, index x} to {IC, set/way address y}. Then, the ISB entry (both tag and data) may be invalidated and becomes ready for new allocations. Thus, when the IFU data 210 reads the hit vector, then the IFU data 210 may process the hit vector as an IC hit via the operations 408 and 410 shown in FIG. 4. The process may continue from the operation 610 to an operation 612.

When no fill has occurred at the decision operation 606 (following the "no" route), or after finishing the operations 608-610, then at 612, the process may detect whether the IFU data 210 has read the HVQ at the operation 406. If there is no read (following the "no" route), then the process 600 may loop back to the operation 602. When the there is a read (following the "yes" route from the decision operation 612), then processing may continue at 614.

At 614, the process 600 may read the hit vector from the "tail" entry of the FIFO queue.

At 616, the process may send the hit vector to the IFU data 210, which is received at the operation 406 shown in FIG. 4. The operations 614 and 616 may be similar to the operation 402.

Illustrative System

Figure 7:
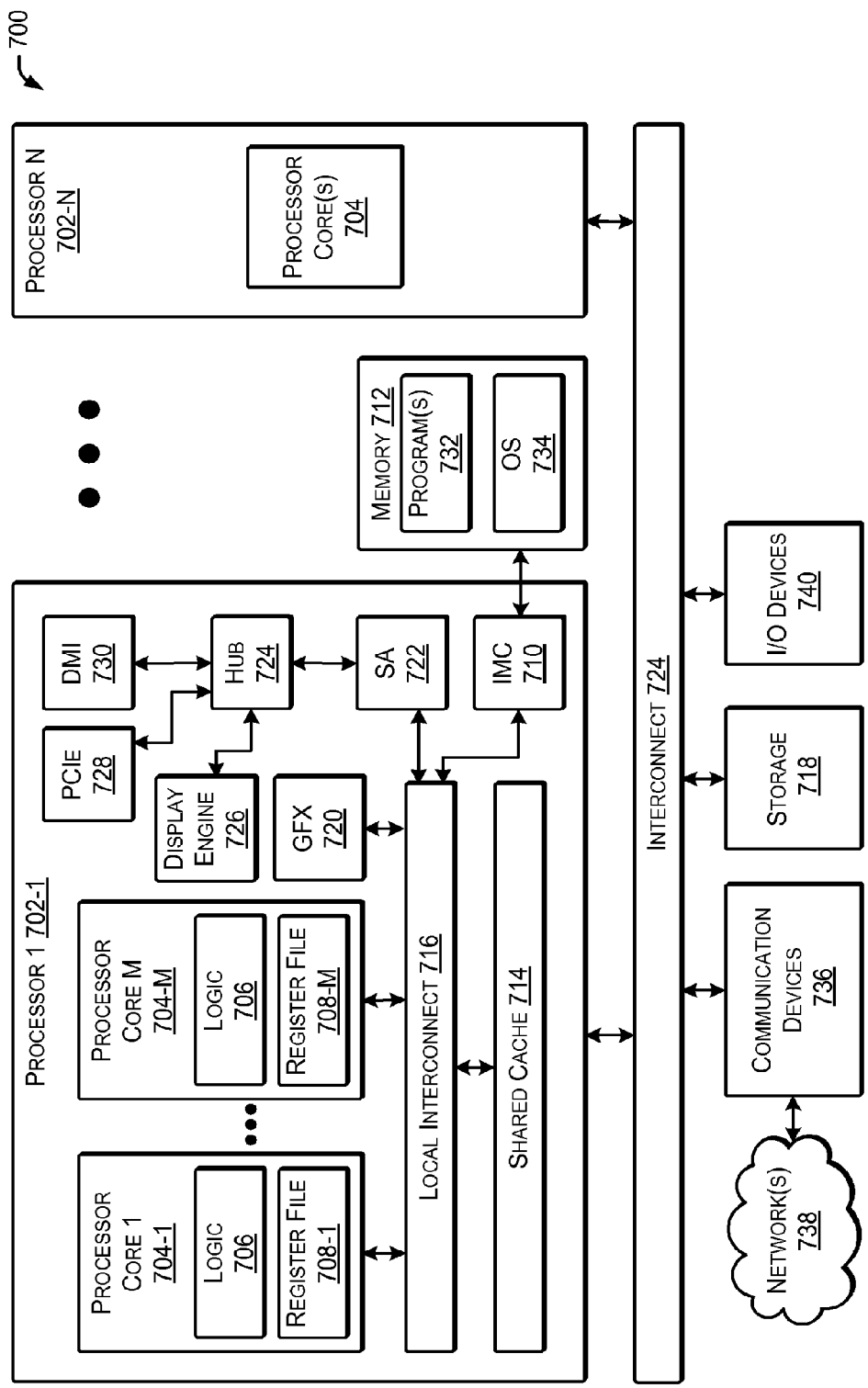
FIG. 7 is a block diagram of an illustrative architecture of a system to handle cache misses using tag lookups that are decoupled from instruction byte accesses.

FIG. 7 is a block diagram of an illustrative architecture of a system to handle cache misses using tag lookups that are decoupled from instruction byte accesses. The system 700 may include one or more processors 702-1, ..., 702-N (where N is a positive integer≥1), each of which may include one or more processor cores 704-1, ..., 704-M (where M is a positive integer≥1). In some implementations, as discussed above, the processor(s) 702 may be a single core processor, while in other implementations, the processor(s) 702 may have a large number of processor cores, each of which may include some or all of the components illustrated in FIG. 7. For example, each processor core 704-1, . . . , 704-M may include an instance of logic 706 for interacting with a register file 708-1, . . . , 708-M and/or performing at least some of the operations discussed herein. The logic 706 may include one or more of dedicated circuits, logic units, microcode, or the like.

The processor(s) 702 and processor core(s) 704 can be operated, via an integrated memory controller (IMC) 710 in connection with a local interconnect 716, to read and write to a memory 712. The processor(s) 702 and processor core(s) 704 can also execute computer-readable instructions stored in a memory 712 or other computer-readable media. The memory 712 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 704, in some implementations, the multiple processor cores 704 may share a shared cache 714, which may be accessible via the local interconnect 716. Additionally, storage 718 may be provided for storing data, code, programs, logs, and the like. The storage 718 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 700, the memory 712 and/or the storage 718 may be a type of computer readable storage media and may be a non-transitory media.

In various embodiments, the local interconnect 716 may also communicate with a graphical controller (GFX) 720 to provide graphics processing. In some embodiments, the local interconnect 716 may communicate with a system agent 722. The system agent 722 may be in communication with a hub 724, which connects a display engine 726, a PCIe 728, and a DMI 730.

The memory 712 may store functional components that are executable by the processor(s) 702. In some implementations, these functional components comprise instructions or programs 732 that are executable by the processor(s) 702. The example functional components illustrated in FIG. 7 further include an operating system (OS) 734 to mange operation of the system 700.

The system 700 may include one or more communication devices 736 that may include one or more interfaces and hardware components for enabling communication with various other devices over a communication link, such as one or more networks 738. For example, communication devices 736 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 700 may further be equipped with various input/output (I/O) devices 740. Such I/O devices 740 may include a display, various user interface controls (e.g., buttons, joystick, keyboard, touch screen, etc.), audio speakers, connection ports and so forth. An interconnect 724, which may include a system bus, point-to-point interfaces, a chipset, or other suitable connections and components, may be provided to enable communication between the processors 702, the memory 712, the storage 718, the communication devices 736, and the I/O devices 740.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor comprising:
   a branch prediction unit (BPU) to create branch predictions and fetch addresses;
   an instruction fetch unit (IFU), coupled with the BPU, the IFU including
   an IFU tag unit to:
      perform instruction translation look-aside buffer (ITLB) and instruction cache (IC) tag lookups and
      send a fetch request to a page miss handler (PMH) when an ITLB miss occurs, or to lower level memory when an IC miss and an instruction stream buffer (ISB) miss occurs; and
   an IFU data unit to:
      retrieve instruction bytes from the IC or the ISB based on the tag lookups, and
      send the instruction bytes through decode logic to an execution pipeline.

2. The processor as recited in claim 1, wherein the IFU tag unit to store an IC set and way address or an ISB index in a hit vector queue (HVQ).

3. The processor as recited in claim 2, wherein the IFU data unit retrieves, from the HVQ, a hit vector that includes the IC set and way address or the ISB index.

4. The processor as recited in claim 3, wherein the HVQ to replace the ISB index after a corresponding instruction is written into the IC, the HVQ to replace the ISB index with the IC set and way address for the corresponding instruction written into the IC.

5. The processor as recited in claim 1, wherein the BPU and IFU tag unit to perform operations in a BPU/IFU tag pipeline that runs ahead of an IFU data pipeline that retrieves the instruction bytes from the IC or the ISB.

6. The processor as recited in claim 1, wherein the IFU data unit to stall when the fetch request is not fulfilled after the IFU data accesses an ISB entry indexed by a hit vector and bytes are not ready.

7. The processor as recited in claim 1, wherein the BPU/IFU tag pipeline stalls when an ITLB miss occurs.

8. The processor as recited in claim 1, wherein the BPU and the IFU tag unit operate in parallel, the IFU tag receiving a current fetch address from a next instruction pointer logic shared with the BPU.

9. The apparatus as recited in claim 1, wherein the BPU to write the branch predictions into a branch prediction queue (BPQ), and wherein the BPU/IFU tag pipeline to stall when the BPQ is full until the IFU data unit consumes and deallocates an entry from the BPQ.

10. An apparatus comprising:
    a first logic to create branch predictions and fetch addresses;

a second logic, coupled with the first logic, to send an instruction translation buffer (ITLB) request to a page miss handler (PMH) when an ITLB miss occurs, and a fetch request to lower level memory when an instruction cache (IC) miss and an instruction stream buffer (ISB) miss occurs for the fetch addresses; and a third logic to retrieve instruction bytes from the IC or the ISB based on tag lookups, the retrieved bytes sent to an execution pipeline.

11. The apparatus as recited in claim 10, wherein the second logic is an instruction fetch unit (IFU) tag unit to store an IC set and way address or an ISB index in a hit vector queue (HVQ).

12. The apparatus as recited in claim 11, wherein the third logic is an IFU data unit to that receive, from the HVQ, a hit vector that includes the IC set and way address or the ISB index.

13. The apparatus as recited in claim 10, wherein the first and second logic run ahead of the third logic such that the fetch request is fulfilled prior to the third logic, retrieval of the instruction bytes from the ISB.

14. The apparatus as recited in claim 10, wherein the third logic to stall when the fetch request is not fulfilled when upon access of the ISB entry indexed by a hit vector and corresponding bytes are not ready in the ISB.

15. The apparatus as recited in claim 10, wherein the first logic and the second logic perform in parallel in a shared pipeline.

16. A computer-implemented method comprising:
generating branch predictions and fetch addresses in a first pipeline;
performing, in the first pipeline, instruction translation look-aside buffer (ITLB) and instruction cache (IC) tag lookups for the fetch addresses;
sending, in the first pipeline, a fetch request to lower level memory when an IC miss and an instruction stream buffer (ISB) miss occur; and
retrieving, using a second pipeline, instruction bytes from the IC or the ISB based on the tag lookups, the instruction bytes from the ISB including instruction bytes retrieved in advance from the fetch request.

17. The method as recited in claim 16, further comprising:
storing, in a first pipeline, the IC set and way address or an ISB index in a hit vector queue (HVQ); and
retrieving, in the second pipeline, the IC set and way address or the ISB index from the HVQ.

18. The method as recited in claim 16, further comprising replacing the ISB index with the IC set and way address after a corresponding instruction is written into the IC.

19. The method as recited in claim 16, wherein the first pipeline runs ahead of the second pipeline such that the fetch request is performed ahead of the retrieving instruction bytes from the ISB to avoid a stall in the second pipeline.

20. The method as recited in claim 16, wherein the generating the branch predictions and the performing the ITLB and IC tag lookups occur in parallel.

21. The method as recited in claim 16, further comprising stalling the second pipeline when the fetch request is not fulfilled prior to the retrieving of corresponding instruction bytes.

* * * * *